June 9, 1936.  W. DUBILIER  2,043,532
ELECTRICAL CONDENSER
Filed Dec. 10, 1932  2 Sheets-Sheet 1
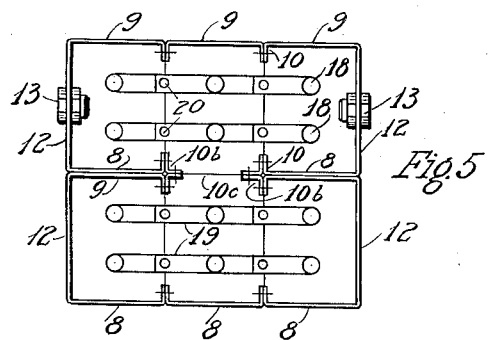
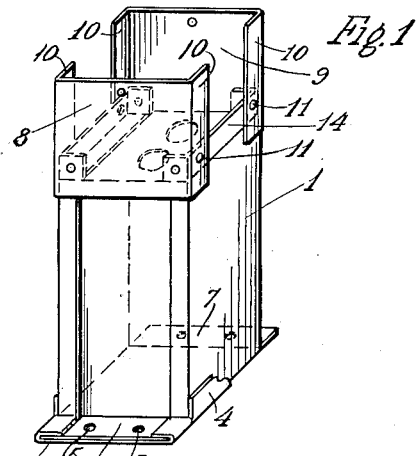
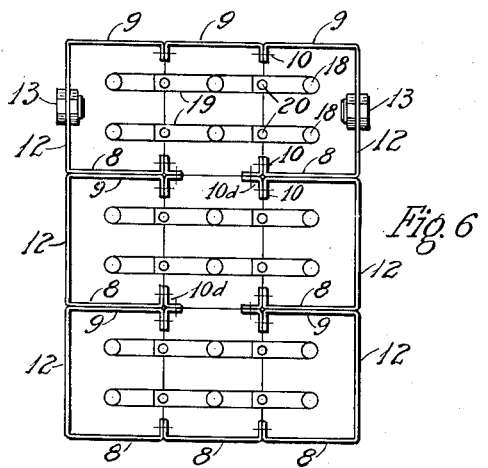
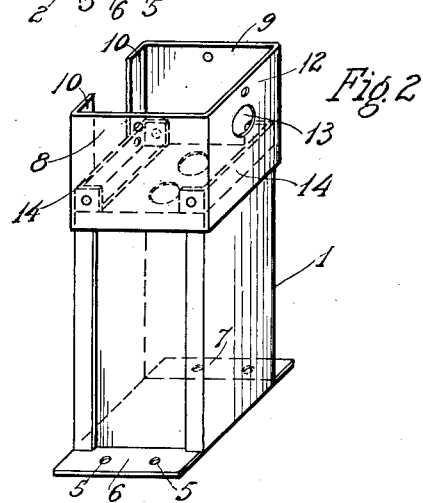
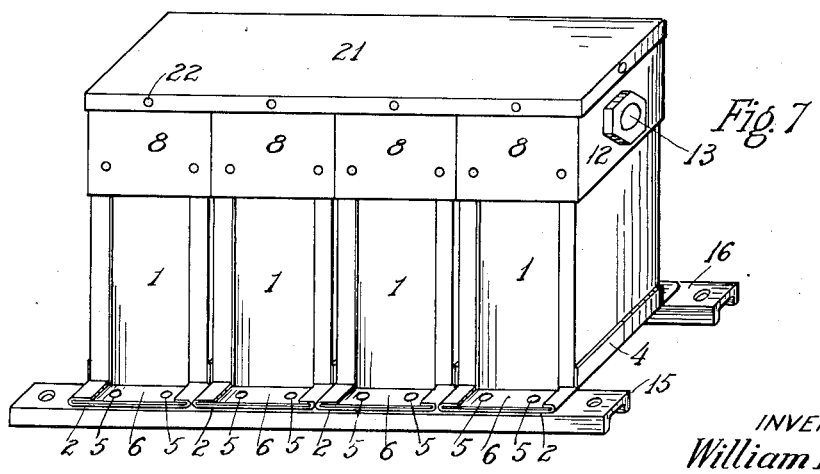
INVENTOR
William Dubilier
BY
Edwards, Bower & Pool
ATTORNEYS June 9, 1936.  W. DUBILIER  2,043,532
ELECTRICAL CONDENSER
Filed Dec. 10, 1932  2 Sheets-Sheet 2

INVENTOR
William Dubilier
BY
Edwards, Bower & Pool
ATTORNEYS

Patented June 9, 1936

2,043,532

UNITED STATES PATENT OFFICE 2,043,532

ELECTRICAL CONDENSER

William Dubilier, New Rochelle, N. Y., assignor to Dubilier Condenser Corporation, New York, N. Y., a corporation of Delaware Application December 10, 1932, Serial No. 646,618

20 Claims. (Cl. 175—41)

My invention relates to electrical condensers, and more particularly to an improved assembly arrangement of electric condenser units which is especially applicable to the type of condenser used for power factor correction purposes for electric power installations.

A main object of my invention contemplates a novel inexpensive mounting or assembly arrangement for static electrical condenser structures consisting of individual unit condensers especially of the type comprising a double walled container consisting of an inner can to provide an oil-tight enclosure and an outer casing or housing which affords the necessary protection and mechanical rigidity.

Another object of my invention is to provide simple and easy means for mounting a desired number of standard unit condensers without additional mounting means in such a manner that the condensers themselves as mounted together act as their own mounting rack or frame, thus decreasing cost and bulk of equipment and space required for the complete assembly.

The invention in particular consists in the arrangement of an electric condenser assemblage comprising a plurality of standard unit condensers each provided with an extension compartment for both protecting the connecting terminals and at the same time serving as a mounting means for mechanically connecting a number of standard unit condensers in such a manner that the condenser units substantially act as their own mounting frame or rack. In this manner, costs of mounting as well as space occupied are decreased to a considerable extent.

According to a more specific embodiment of my invention, I provide standard units with attached extension compartments of at least two different types, viz., so-called end types, and one or more intermediate types, in such a manner that a desired number of such units may be assembled with open spaces between the individual units, for operation under a desired voltage and for making electrical connections of the condensers in any desired manner for securing a desired resultant capacity value.

The invention will be described in detail in connection with the accompanying drawings which show various forms of construction embodying its novel features. In the drawings, Fig. 1 is a perspective view of a casing for an electric condenser in accordance with my invention, said casing being of the intermediate type within the complete mounting or assembly;

Fig. 2 is a perspective view of a casing of the end type;

Figs. 5 and 6 illustrate in top plan views modified condenser assemblies, parts being omitted for the sake of clearness;

Fig. 7 shows a perspective view of a complete condenser comprising four units.

Figure 3:
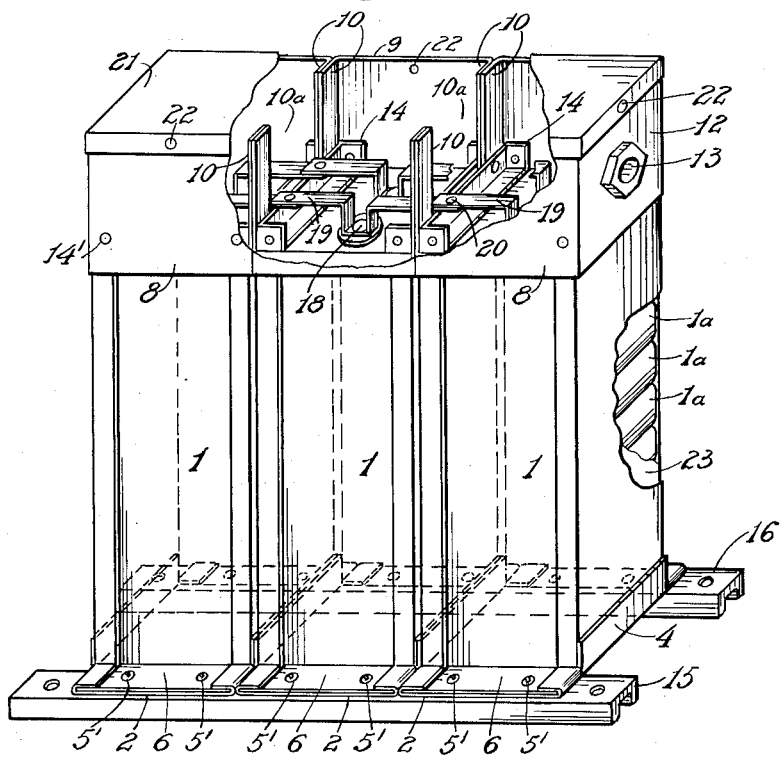
Fig. 3 is a perspective view, partly broken away, of a complete mounting or assembly of three unit condensers of the types shown in Figs. 1 and 2.
Figure 4:
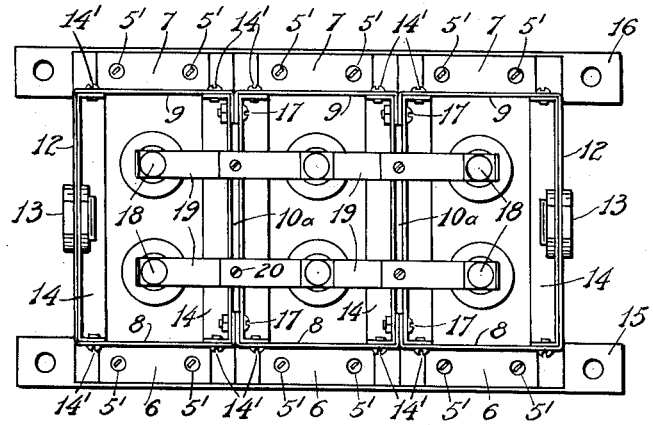
Fig. 4 is a top plan view of the condenser structure shown in Fig. 3 with the cover removed.

Referring first to Fig. 1, this illustrates one type of a standard unit container 1 for housing a condenser, the details of the enclosed condenser being omitted. The container 1 is of the intermediate type and is or may be assembled with end type containers as illustrated in Figs. 3 and 4. The intermediate container 1 has an open bottom for convenient insertion of the condenser proper. After such insertion, a closure member or bottom cover 2 may be secured in any way as by a riveting or bending operation. In the preferred form the bottom cover or closure member 2 consists of a metal plate having its sides 3 and 4 bent up to engage opposite walls of the container 1 and having its remaining side portions secured by eyelets 5 to projecting feet 6 and 7 of the container 1 (Figs. 1 and 3).

An extension compartment secured to the top of the container 1 serves the double purpose according to the invention of housing and protecting the connecting terminals of the condenser for interconnection of the individual condenser units in the mounting assembly in any desired manner, and at the same time serves as a means for mechanically securing and mounting any desired number of individual units together in a rigid self-contained mounting or assembly. In this manner, the condensers, as pointed out above, act as their own mounting rack or support and the operation of mounting is greatly simplified and the mounting material and mounting space reduced to a minimum; resulting in considerable decrease of cost of the complete condenser equipment.

According to the embodiment shown in Fig. 1, the extension compartment is composed of two opposite walls 8 and 9 with their edges angularly bent to form mounting flanges 10. In this manner, by placing a number of units side by side, the flanges 10 of one unit will face the flanges of an adjacent unit and serve for mechanical connection of the units, such as by a riveting, bolting or other connecting operation, screws, rivets or bolts being passed through the eyes or holes 11 in the mounting flanges 10, as illustrated by the connecting screw bolts 17 in Fig. 4.

The unit shown in Fig. 1 is of the so-called intermediate type to be used in the assembly, as seen more clearly from Fig. 3 to be described, with both free sides of the extension walls 8 and 9 bent over to form mounting flanges 10. In this manner, opposite openings 10a are obtained, allowing the electrical interconnection of the mounted condenser with further units arranged at both the left and the right of the intermediate unit.

Referring to Figure 2, this shows a similar unit to Fig. 1 with the exception that one side of the extension compartment is closed by a solid wall 12 provided with an opening 13 for passing a connecting lead to the outside of the condenser. This unit serves as an end unit for both the right and left end in a condenser mounting assembly, as shown in Fig. 3.

The intermediate and end extension compartments housing the connecting terminals and serving as mounting connections of the units and comprising respectively side walls 8, 9, and 8, 9, 12 as described, may be secured to the associate main containers 1 in any suitable manner, as by spot welding, riveting or the like, either directly or by providing separate connecting means. As shown herein in Figs. 1-4 such separate connecting means are in the form of angle irons 14, connecting the main containers and the associate extension compartments by screws 14', the angle irons themselves having their bottoms spot welded to the tops of the main containers.

Figs. 3 and 4 show a complete mounting or assembly comprising three units, namely two end units of the Fig. 2 type and an intermediate unit of the Fig. 1 type. It will of course be understood that any number of intermediate units according to Fig. 1 may be employed in place of the single unit shown in Figs. 3 and 4. The containers 1 in the form of rectangular metallic cases each encloses and houses a condenser proper 1a, constituted usually by a plurality of sections. The condenser units each comprising a container 1 and the enclosed condenser sections 1a, are arranged side by side closely adjacent to each other with their bottom covers 2 in place as shown, and are mounted upon a common support, such as a pair of spaced, parallel rails 15 and 16, and suitably secured thereto as by means of rivets or bolts 5' passing through the eyes or holes 5 provided in the side portions of the bottom covers 2 and in the projecting feet 6 and 7 of the bottom cover, respectively. After the units have thus been mounted, the extension compartments are connected together as described, as by means of screws or rivets 17 connecting the bent-over mounting flanges 10 of the extension compartments.

The connection of the condenser terminals 18 of different units may be effected in any desired manner, as by a series or parallel connection, or a combination of both as by the illustrated means comprising connecting members 19 joined together by clamps or screws 20. The openings 10a provide convenient passageways for the connecting means. After such connection, a common cover 21 of proper size is screwed on as indicated at 22, or otherwise secured to the top of the complete assembly to serve as a further holding or securing element and completely closing the assembly and covering the high tension carrying parts of the condenser. Fig. 7 illustrates a finished condenser with a suitable cover in place, and employing a larger number of units than the Fig. 3 form.

It will be readily understood that many other modifications and arrangements of a condenser assembly according to the invention are possible. Thus, for example, a number of rows or sections of units mounted as shown by Figs. 3 and 4 may be arranged side by side and interconnected mechanically in a similar manner as the units of one section are mounted. Such an arrangement is illustrated in Fig. 5 wherein two sections, each comprising three condenser containers, are mounted side by side. In this case, the intermediate condensers are somewhat different from those shown in Fig. 1 in that their extension compartments have three open walls, instead of only two open walls as shown by Fig. 1, and whereby simple connecting flanges 10b are provided in place of either walls 8 or 9. This enables the interconnection of the two sections to be effected through the opening or passageways 10c.

Fig. 6 illustrates, by way of example, another possible assembly comprising three sections of three units each. In this case another type of standard unit may be required in which all of the walls of the extension compartment are open and simply consist of connecting flanges 10d, as is readily seen from the center unit. The type of unit used depends on the electric connection to be made between the individual condensers. In this example, condensers of individual sections and the sections themselves may easily be connected in parallel; but any other connection may be chosen and condenser units with extension compartments arranged in such a manner as to enable the most convenient and shortest arrangement of the connecting wires or bus bars between the individual units in any desired manner.

The containers or casings herein shown are of the double-wall type, the inner wall being indicated at 23, Fig. 3, but other types of containers may be employed and other changes in construction and variations in arrangements besides those illustrated and described may be made without departing from the spirit and scope of the invention, and the principles of the invention may be employed of course with condenser units of types different from the one illustrated herein.

I claim:

1. In combination, a plurality of electrical condenser units having metallic casings enclosing condenser bodies, the casings extending beyond the bodies to provide extension compartments, and detachable means between certain of the walls of said extension compartments for mechanically and rigidly connecting the condenser units directly one to another, certain of the extension walls having openings to provide passageways for electrical connections.

2. In combination, a plurality of electrical condenser units having double-wall metallic casings and condenser bodies enclosed therein, the outer casing walls extending beyond the condenser bodies to provide extension compartments, certain of the walls of the extension compartments having openings to provide passageways for electrical connections, and detachable means for mechanically and rigidly connecting the condenser units together.

3. A condenser assembly comprising metal condenser casings and extension compartments for housing connecting terminals wherein the extension compartments consist of extension walls detachably secured to the metal casing of said units, certain of the extension walls being provided with openings to obtain an all-enclosed assembly of the mounted units and for enabling electrical interconnection between the terminals enclosed by the extension compartments, and means for detachably securing said walls to said casings, said securing means also serving to secure the walls themselves together.

4. A mounting assembly as set forth in claim 3 wherein the extension compartments in the mounted assembly are provided with a cover member fitting over a corresponding number of assembled units and serving as a further mounting element to hold said units together in a rigid assembly.

5. In an electrical condenser assembly, a plurality of condenser units each comprising a metal casing and a condenser body; extension compartments comprised of walls extending from the ends of said casings beyond the associate condenser bodies for housing the condenser terminals and positively and directly connected one to another so as to mechanically and rigidly connect together a number of units mounted adjacent to each other, certain of said walls being arranged to afford passageways for electrical interconnecting means between the condenser units.

6. In an electrical condenser assembly, a plurality of condenser units each having a metal container of substantially rectangular shape, walls extending from the sides of said containers to form housing compartments for the condenser terminals and serving when individually connected together as a mounting means for mechanically connecting together a plurality of condenser units to be mounted closely adjacent each other side by side, and a cover for said housing compartments fitting a definite number of mounted units and serving as a further means for mechanically racking the condensers together to form a rigid assembly.

7. A condenser assembly as set forth in claim 6, wherein different types of housing compartments are used with certain of the extension walls eliminated and substituted by bent-over portions from the adjacent walls to form mounting flanges for the units to provide an all-enclosed housing compartment of the mounted assembly with openings between individual compartment units for enabling electrical interconnection of the assembled condensers.

8. A condenser assembly as set forth in claim 6 in which at least two types of standard units are used, an intermediate unit with a housing compartment comprised of two opposite walls secured to the condenser casing and with bent-over portions to the remaining sides of the compartments to serve as mounting flanges, and an end type unit with a housing compartment comprising three extension walls secured to the condenser container with the fourth side of the compartment being left open and provided with bent-over portions from the adjacent walls to serve as mounting flanges.

9. A condenser assembly as set forth in claim 6 in which the condenser units are mounted with their bottoms upon a common support and their housing compartments at the tops are mechanically connected to form a rigid assembly, such mechanical connection being housed within and protected by the housing compartments.

10. A multiple electrical condenser assembly composed of a plurality of detachable condenser units mounted side by side, and each comprising a casing body enclosing its condenser proper, and an open-topped portion extending from the casing body, the open tops terminating in a common plane; a detachable covering means for the open-topped portions, said portions opening into each other laterally beneath the covering means to provide passageways for electrical interconnecting means between the condenser units; an individual means rigidly connecting each open-topped portion directly to the open-topped portion of the next adjoining condenser unit to hold the entire assembly of units in set relationship.

11. In combination, a plurality of electrical condenser units each having metallic casings enclosing condenser bodies, the casing walls extending beyond the bodies to provide extension compartments and detachable connecting means directly connecting certain of the walls of said extension bodies to provide at one end the sole means of mounting the condenser units in an assembly.

12. In combination, a plurality of condenser units each having an extension thereon for housing and protecting the connecting terminals of the condenser, and means connecting said extensions to mechanically secure and mount a plurality of individual units together in a rigid assembly, the extensions at one end being directly interconnected to provide at one end the sole means for rigidly connecting the plurality of units.

13. In combination, a plurality of condenser units each having an extension thereon for housing and protecting the connecting terminals of the condenser, and means connecting said extensions to mechanically secure and mount a plurality of individual units together in a rigid assembly, the extensions at one end being directly interconnected to provide the sole means for rigidly assembling the units together to provide a rack for the completed assembly.

14. In combination, a plurality of condenser units each having an extension thereon for housing and protecting the connecting terminals of the condenser, and means connecting said extensions to mechanically secure and mount a plurality of individual units together in a rigid assembly, the extensions being directly interconnected to provide the sole means for rigidly connecting the plurality of units at one end and connecting devices at the opposite end common to all of the units.

15. In combination, a plurality of electrical condenser units each having metallic casings enclosing condenser bodies, the casing walls extending beyond the bodies to provide extension compartments, and detachable connecting means between certain of the walls of said extension bodies providing at one end the sole means of mounting the condenser units in an assembly, the units being so arranged that when thus assembled in a rigid group their detachable connecting means may be employed to attach another group or groups together with the first group to provide a single rigid assembly.

16. A multiple electric condenser assemblage comprising a plurality of condenser units, each including a condenser proper and a container therefor, each unit provided with an extension compartment protecting the condenser terminals and individual means rigidly connecting each extension compartment directly to the extension compartment of the next adjoining condenser unit to hold the entire assemblage of units in set relationship.

17. A multiple electric condenser assemblage comprising a plurality of condenser units, each including a condenser proper and a container therefor, each unit provided with an extension compartment protecting the condenser terminals and individual means rigidly connecting each extension compartment to the extension compartment of the next adjoining condenser unit to hold the entire assemblage of units in set relationship, said individual connecting means being entirely housed within and protected by the extension compartments.

18. A multiple electric condenser assemblage comprising a plurality of condenser units, each including a condenser proper and a container therefor, each unit provided with an extension compartment protecting the condenser terminals and individual means rigidly connecting each extension compartment to the extension compartment of the next adjoining condenser unit to hold the entire assemblage of units in set relationship, said compartments having open ends terminating in a substantially common plane, and covering means common to the compartments.

19. A multiple electric condenser assemblage comprising a plurality of condenser units, each including a condenser proper and a container therefor, each unit provided with an extension compartment protecting the condenser terminals and individual means rigidly connecting each extension compartment to the extension compartment of the next adjoining condenser unit to hold the entire assemblage of units in set relationship, said individual connecting means being entirely housed within and protected by the extension compartments, and additional means providing a support common to all of the units and securing the units together at their portions opposite from the compartments.

20. An assembly arrangement for multiple condenser structures wherein each unit is provided with an extension compartment protecting the condenser terminals, said compartments being of at least two types, one an intermediate type comprising separated oppositely-disposed flanged endwalls, and the other an end-type having one open side terminating in inturned flanges, and individual means rigidly connecting the flanges of each extension compartment to the adjacent flanges of the adjoining extension compartment to maintain the entire assembly as a rigid whole.

WILLIAM DUBILIER.